(12) United States Patent
Holland (10) Patent No.: US 10,295,418 B1
(45) Date of Patent: May 21, 2019

(54) FACTORY-CALIBRATED MULTI-SPOKE STRAIN SENSOR SYSTEM

(71) Applicant: X Development LLC, Mountain View, CA (US)

(72) Inventor: Eric Holland, Sunnyvale, CA (US)

(73) Assignee: X Development LLC, Mountain View, CA (US)

(*) Notice: Subject to any disclaimer, the term of this patent is extended or adjusted under 35 U.S.C. 154(b) by 129 days.

(21) Appl. No.: 15/376,845

(22) Filed: Dec. 13, 2016

Related U.S. Application Data (60) Provisional application No. 62/314,582, filed on Mar. 29, 2016.

(51) Int. Cl.
  *G01L 3/10* (2006.01)
  *G01L 3/14* (2006.01)
(52) U.S. Cl.
  CPC ............ *G01L 3/108* (2013.01); *G01L 3/1457* (2013.01); *G01L 3/10* (2013.01)
(58) Field of Classification Search
  CPC .......... G01L 3/1457; G01L 3/10; G01L 3/108
  USPC ....... 73/862.331–862.338, 862.041–862.045, 73/862.325
  See application file for complete search history.

(56) References Cited

U.S. PATENT DOCUMENTS

| | | | | |
|---|---|---|---|---|
| 4,094,192 A | * | 6/1978 | Watson | G01L 5/161 338/2 |
| 4,573,362 A | * | 3/1986 | Amlani | G01L 1/2218 73/862.044 |
| 4,577,513 A | * | 3/1986 | Harwood | G01L 3/1457 414/730 |
| 4,640,138 A | * | 2/1987 | Meyer | G01L 5/226 73/862.044 |
| 4,763,531 A | | 8/1988 | Dietrich et al. | |
| 4,854,179 A | * | 8/1989 | Haggstrom | G01L 1/2231 73/862.632 |
| 4,876,524 A | * | 10/1989 | Jenkins | G01L 1/225 338/2 |
| 5,339,696 A | * | 8/1994 | Carignan | G01L 1/2206 73/761 |
| 5,513,536 A | * | 5/1996 | Reger | B25J 13/085 73/814 |
| 5,648,617 A | * | 7/1997 | Cullen | G01L 1/2231 73/862.042 |

(Continued)

*Primary Examiner* — Jonathan M Dunlap
(74) *Attorney, Agent, or Firm* — McDonnell Boehnen Hulbert & Berghoff LLP (57) ABSTRACT

A sensor system includes a body, which includes an outer wall defining an inner opening centered about an axis, and radiating structures disposed in the opening and extending radially from the axis to the outer wall. The radiating structures are spaced circumferentially around the axis by a substantially equal angle. The system includes sensors that generate signals in response to deformations of the radiating structures. The signals provide vectors corresponding to the deformations. The deformations are caused by: (i) a torque about the axis, and (ii) a secondary torque or force. The system includes a controller electrically coupled to the sensors and configured to determine, by combining the vectors provided by the signals, a measurement of the torque about the axis. The sensors are arranged on the radiating structures such that combining the vectors substantially eliminates any effect of the secondary torque or force from the measurement.

20 Claims, 7 Drawing Sheets

(56) References Cited

U.S. PATENT DOCUMENTS

| | | | |
|---|---|---|---|
| 5,672,834 A | 9/1997 | Searle et al. | |
| 5,894,094 A | 4/1999 | Kuchler et al. | |
| 5,969,268 A * | 10/1999 | Sommerfeld | G01L 1/2206 73/862.041 |
| 6,038,933 A * | 3/2000 | Meyer | G01L 1/2206 73/146 |
| 6,068,394 A * | 5/2000 | Dublin, Jr. | E21B 47/0006 175/39 |
| 6,324,919 B1 * | 12/2001 | Larsen | G01L 1/2231 73/862.043 |
| 6,408,685 B2 * | 6/2002 | Shin | F01L 1/02 73/114.01 |
| 6,575,031 B2 * | 6/2003 | Haeg | G01M 1/225 73/146 |
| 6,651,518 B1 * | 11/2003 | Miyazaki | B60T 8/171 73/862.044 |
| 6,694,828 B1 * | 2/2004 | Nicot | B62D 1/16 180/422 |
| 6,769,312 B2 * | 8/2004 | Meyer | G01L 1/2231 73/862.042 |
| 6,792,815 B2 * | 9/2004 | McDearmon | G01D 21/02 73/862.041 |
| 7,093,477 B2 | 8/2006 | Herbold et al. | |
| 7,437,954 B2 * | 10/2008 | Sakano | G01L 5/161 73/862.043 |
| 7,707,893 B2 * | 5/2010 | Johansson | B25J 13/085 700/258 |
| 7,743,672 B2 * | 6/2010 | Kurtz | G01L 3/1457 73/862.041 |
| 7,779,705 B2 * | 8/2010 | Mastinu | G01L 3/22 73/862.046 |
| 8,141,438 B2 * | 3/2012 | Roessingh | G01L 3/1457 73/862.191 |
| 8,291,775 B2 * | 10/2012 | Nagasaka | G01L 3/1457 73/862.041 |
| 8,671,780 B2 * | 3/2014 | Kwom | G01L 5/161 156/196 |
| 8,726,741 B2 | 5/2014 | Krippner et al. | |
| 8,776,616 B2 | 7/2014 | Szasz et al. | |
| 8,844,377 B2 * | 9/2014 | Yap | G01L 3/1457 73/862.046 |
| 8,943,902 B2 * | 2/2015 | Bosscher | G01L 5/226 73/862.041 |
| 9,200,969 B2 * | 12/2015 | Ueno | G01L 5/16 |
| 9,448,128 B2 * | 9/2016 | Kim | G01L 5/161 |
| 9,993,309 B2 * | 6/2018 | Bowling | B25J 13/085 |
| 2003/0209085 A1 * | 11/2003 | McDearmon | G01D 21/02 73/862.041 |
| 2009/0229378 A1 * | 9/2009 | Kurtz | G01L 5/223 73/862.041 |
| 2009/0301217 A1 * | 12/2009 | Kurtz | G01L 3/1457 73/847 |
| 2010/0005907 A1 * | 1/2010 | Kato | G01L 3/1457 73/862.041 |
| 2010/0050785 A1 * | 3/2010 | Roessingh | B62M 9/12 73/862.191 |
| 2010/0164711 A1 * | 7/2010 | Arms | B64C 27/006 340/539.1 |
| 2012/0266694 A1 * | 10/2012 | Szasz | G01L 5/161 73/862.044 |
| 2013/0239701 A1 * | 9/2013 | Huang | G01L 1/22 73/862.045 |
| 2014/0260596 A1 * | 9/2014 | Kubicek | G01W 1/10 73/170.16 |
| 2016/0033346 A1 * | 2/2016 | Kubicek | G01W 1/10 73/170.16 |
| 2017/0153156 A1 * | 6/2017 | Nitz | G01L 3/108 |

* cited by examiner

FACTORY-CALIBRATED MULTI-SPOKE STRAIN SENSOR SYSTEM

CROSS-REFERENCE TO RELATED APPLICATION

This application claims the benefit of U.S. Provisional Patent Application Ser. No. 62/314,582, filed Mar. 29, 2016, which is hereby incorporated by reference in its entirety.

BACKGROUND

Unless otherwise indicated herein, the materials described in this section are not prior art to the claims in this application and are not admitted to be prior art by inclusion in this section.

In a system employing mechanical components, one mechanical component may generate a torque that causes movement by another component in the system or resists movement by another component in the system. There may be a need to measure the generated torque. For example, a measurement of the generated torque provides feedback that allows the system to adjust the generated torque.

SUMMARY

According to aspects of the present disclosure, a sensor system for determining torque includes a body. The body includes an outer wall defining an inner opening centered about an axis. The body also includes a plurality of radiating structures disposed in the opening and extending radially from the axis to the outer wall. The radiating structures are spaced circumferentially around the axis by a substantially equal angle. The system also includes a plurality of sensors disposed on the radiating structures and configured to generate signals in response to deformations of the radiating structures. The signals provide vectors corresponding to the deformations of the radiating structures. The deformations of the radiating structures are caused by: (i) a torque experienced by the body about the axis, and (ii) a secondary torque or force experienced by the body. In addition, the system includes a controller electrically coupled to the plurality of sensors. The controller includes one or more processors and one or more computer-readable storage devices. The one or more computer-readable storage devices store computer-executable instructions that cause the one or more processors to determine, by combining the vectors provided by the signals from the sensors, a measurement of the torque about the axis. The sensors are arranged on the radiating structures such that combining the vectors substantially eliminates any effect of the secondary torque or force from the measurement of the torque about the axis.

According to aspects of the present disclosure, a sensor system for determining torque, includes a body. The body includes an outer wall defining an inner opening centered about an axis. The body includes a plurality of radiating structures disposed in the opening and extending radially from the axis to the outer wall. The radiating structures are spaced circumferentially around the axis by a substantially equal angle. The system includes a plurality of sensors disposed on the radiating structures and configured to generate signals in response to deformations of the radiating structures. The signals provide vectors corresponding to the deformations of the radiating structures, the deformations of the radiating structures being caused by: (i) a torque experienced by the body about the axis, and (ii) a secondary torque or force experienced by the body. The sensors are arranged on the radiating structures such that combining the vectors provided by the signals from the sensors substantially eliminates any effect of the secondary torque or force from the measurement of the torque about the axis and provides a measurement of the torque about the axis.

According to aspects of the present disclosure, a sensor system for determining torque includes a controller including one or more processors and one or more computer-readable storage devices. The controller is configured to be electrically coupled to a plurality of sensors arranged on a sensor body. The sensor body includes an outer wall defining an inner opening centered about an axis. The sensor body includes a plurality of radiating structures disposed in the opening and extending radially from the axis to the outer wall. The radiating structures are spaced circumferentially around the axis by a substantially equal angle. The plurality of sensors are disposed on the radiating structures. The controller is configured to receive signals from the plurality of sensors in response to deformations of the radiating structures generated by a torque applied to the sensor body. The signals provide vectors corresponding to the deformations of the radiating structures. The deformations of the radiating structures are caused by: (i) the torque experienced by the body about the axis, and (ii) a secondary torque or force experienced by the body. The one or more computer-readable storage devices store computer-executable instructions that cause the one or more processors to determine a measurement of the torque about the axis by combining the vectors provided by the signals from the plurality of sensors. The combination of the vectors substantially eliminates any effect of the secondary torque or force from the measurement of the torque about the axis.

These as well as other aspects, advantages, and alternatives, will become apparent to those of ordinary skill in the art by reading the following detailed description, with reference where appropriate to the accompanying drawings.

While the invention is susceptible to various modifications and alternative forms, specific embodiments have been shown by way of example in the Figures and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims. It should be understood that other embodiments may include more or less of each element shown in a given Figure. Further, some of the illustrated elements may be combined or omitted. Yet further, an example embodiment may include elements that are not illustrated in the Figures.

DETAILED DESCRIPTION

The following detailed description describes various features and functions of the disclosed systems and methods with reference to the accompanying figures. In the Figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

I. Overview

In a system employing mechanical components, one mechanical component generates a torque that causes movement by another component in the system or resists movement by another mechanical component in the system. The system employs a measurement assembly to measure the generated torque, i.e., the torque-of-interest. For instance, the torque measurement may provide feedback that allows the system to adjust the generated torque. The measurement assembly includes a torque-receiving body that is coupled to the mechanical components in the system and experiences the torque-of-interest. The torque-of-interest causes torsion in the torque-receiving body. A plurality of sensors are arranged on the torque-receiving body to measure how different sections of the torque-receiving body are deformed by the torsion. The measurements of the deformations at the different sections can then be processed to determine the amount of torsion and thus the torque-of-interest.

In example embodiments, the torque-receiving body of the measurement assembly includes an outer wall that defines an opening centered about an axis. The torque-receiving body also includes a plurality of radiating structures that are disposed in the opening and extend radially from the center axis to the outer wall. The radiating structures are spaced circumferentially around the center axis by a substantially equal angle. In this configuration, the radiating structures appear as spokes, and the torque-receiving body is multi-spoked. For example, the torque-receiving body may include three radiating structures equally separated from each other by approximately 120°. The torque-receiving body experiences the torque-of-interest about the center axis and the corresponding torsion causes the radiating structures to deform. A sensor is provided for each radiating structure and is configured to provide a signal in response to a deformation in the radiating structure.

In example embodiments, the sensor is a strain sensor that measures an amount of elongation or compression associated with the deformation in the radiating structure. For instance, a resistive strain gauge sensor may be mounted to a surface of each radiating structure. As a radiating structure deforms in response to forces or torques, the corresponding resistive strain gauge sensor is elongated or compressed with the deformation. The electrical resistance of the resistive strain gauge sensor changes with elongation or compression. Thus, the deformation in the given radiating structure can be measured by applying a current to the respective resistive strain gauge sensor and determining the electrical resistance, which signals the amount of elongation or compression.

Because elongation of the strain sensor occurs in one direction and compression of the strain sensor occurs in the opposite direction, the deformation can be expressed as a one-dimensional vector, where the magnitude of the vector represents the amount of elongation or compression and the direction of the vector is a positive or negative sign representing elongation or compression. For example, as described herein, elongation of the strain sensor may be represented by a positive value, while compression may be represented by a negative value.

When the measurement assembly is employed to measure the torque-of-interest, the torque-receiving body may experience secondary deformations from secondary forces/torques, such as those associated with bending. The secondary deformations in a radiating structure result in additional elongation or compression of the respective strain sensor. As such, the signal from the respective strain sensor might reflect deformations from secondary forces/torques as well as the torque-of-interest.

According to aspects of the present disclosure, however, the measurement assembly is configured to eliminate the effects of such secondary forces/torques from the measurement of the torque-of-interest. The strain sensors are arranged on the plurality of radiating structures so that the secondary deformations caused by the secondary forces/torques as measured by the strain sensors cancel each other out when the magnitudes and directions of the secondary deformations are combined together. In other words, secondary deformations experienced by one radiating structure are offset in direction and magnitude by secondary deformations experienced by one or more of the other radiating structures. Accordingly, when the one-dimensional vectors representing the deformations measured by the strain sensors are combined, the parts of the deformations not resulting from the torque-of-interest are cancelled out. Thus, the result provides a measurement that only reflects the torque-of-interest. Because the arrangement of the strain sensors causes secondary deformations to cancel each other out, additional supporting structures that prevent or reduce secondary deformations are less necessary.

The measurement system also includes a controller that is electrically coupled to the plurality of strain sensors. The controller is configured to determine a measurement of the torque-of-interest by processing the signals from the strain sensors.

After receiving and processing the signals from the strain sensors, the controller is configured to communicate the measurement of the torque-of-interest to one or more external system(s), where the measurement can be displayed and/or processed further, e.g., as feedback data. The controller may condition the measurement signal for compatible and convenient use with the external system(s). For instance, the controller may convert the measurement into a digital signal for electronic communication to the external system(s).

According to further example embodiments, the elements of the measurement assembly are integrated into a single modular unit. As a modular unit, the measurement assembly provides a self-contained solid state torque sensor that can be easily and conveniently installed and implemented in a mechanical system.

In the modular unit, the controller is fixedly coupled to the torque-receiving body. This allows the strain sensors to be more easily coupled, e.g., via wires, to the controller. The controller is also configured to communicate the measurement of the torque-of-interest, via a wireless data interface, to one or more external systems. Additionally, the controller and the strain sensors are configured to receive power from an external power source via a wireless power interface.

The use of the strain sensors may require initial calibration. The signals from the strain sensors may indicate some baseline deformation of the radiating structures at zero load when the torque-receiving body does not experience any actively generated torques or forces. Calibration data accounts for the baseline deformation detected by the strain sensors and allows the controller to determine more accurately the deformation that actually occurs in response to an applied load.

When the controller is combined with the torque-receiving body during initial manufacturing of the modular measurement assembly unit, the controller can be pre-configured with calibration data for the corresponding set of strain sensors. In other words, the modular measurement assembly unit is factory-calibrated. As long as the controller remains with the set of strain sensors and the calibration data remains available to the controller, use of the set of strain sensors should not require further calibration. Accordingly, the modular measurement assembly unit can be conveniently installed in a system without requiring any re-calibration or programming, i.e., as a "plug and play" unit. In addition, the convenience of the modular unit is enhanced by wireless transmission of data and power. Furthermore, the modular measurement assembly unit is configured to be removably coupled to the system for easier installation and removal for repair or replacement.

II. Example System and Measurement Assembly

Figure 1:
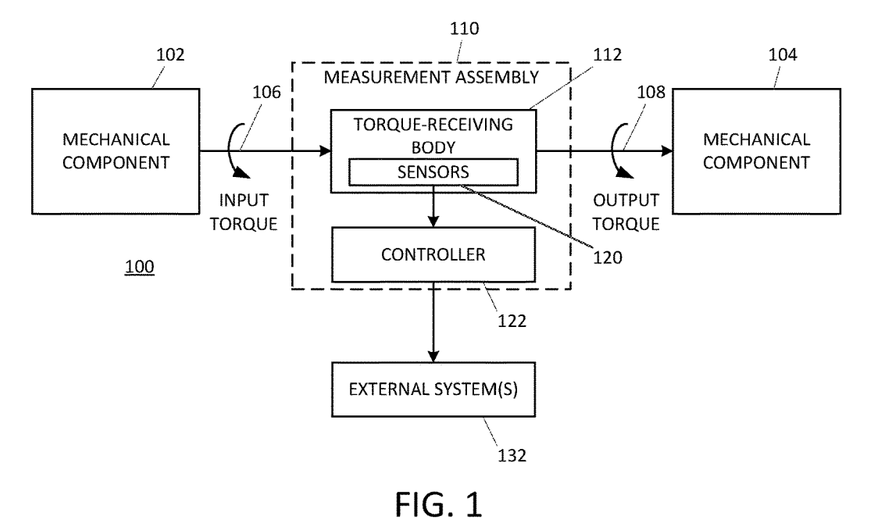
FIG. 1 illustrates an example system including a measurement assembly that measures torque generated by a mechanical component, according to aspects of the present disclosure.

FIG. 1 illustrates an example system 100 that includes at least a first mechanical component 102 and a second mechanical component 104. The first mechanical component 102 generates a torque to cause movement by the second mechanical component 104. For example, the first mechanical component 102 may be a motor, and the second mechanical component 104 may be a rotating robotic arm which is actuated by the torque generated by the motor.

Alternatively, in other systems, the second mechanical component 104 may provide a reaction torque to resist movement by the first mechanical component 102. For example, the first mechanical component 102 may be a robotic arm that experiences a torque and the second mechanical component 104 helps the robotic arm to resist unwanted movement in response to the torque.

The example system 100 employs a measurement assembly 110 to measure the torque, i.e., the torque-of-interest, experienced between the first mechanical component 102 and the second mechanical component 104. As shown in FIG. 1, the measurement assembly 110 includes a torque-receiving body 112. The torque-receiving body 112 is coupled to the first mechanical component 102 and experiences the torque-of-interest via a first coupling 106. In response to the torque-of-interest, the torque-receiving body 112 can rotate to transmit the torque-of-interest to the second mechanical component 104 via a second coupling 108. The torque-receiving body 112 may be formed from a suitable material, such as a metal (e.g., steel, aluminum, etc.), that can transmit the required amount of torque in expected operating conditions and allows the torque to be measured consistently.

To allow effective transmission and measurement of the torque-of-interest, the first coupling 106 minimizes any slip between the first mechanical component 102 and the torque-receiving body 112, and the second coupling 108 minimizes any slip between the torque-receiving body 112 and the second mechanical component 104, respectively. In general, the first coupling 106 and the second coupling 108 may employ any suitable technique or combination of techniques to engage the torque-receiving body 112 and allow the torque-of-interest to be transmitted effectively through the example system 100. Such techniques include, but are not limited to, the use of welding, chemical bonding, adhesives, fastening devices (e.g., bolts, screws, rivets, pins), threaded connections, press-fits, snap-fits, universal joints, ball lock bolts, etc.

The torque-of-interest causes a corresponding torsion in the torque-receiving body 112 as the torque-of-interest is transmitted to the second mechanical component 104. The measurement assembly 110 includes a plurality of strain sensors 120 that measure the amount of torsion in the torque-receiving body 112. The measurement assembly 110 also includes a controller 122 that is electrically coupled to the strain sensors 120. The controller 122 is configured to determine a measurement of the torque-of-interest by processing signals from the strain sensors 120. The controller 122 may be required to amplify the signals from the strain sensors 120 to overcome any unwanted signal noise.

After receiving and processing the signals from the strain sensors 120, the controller 122 is configured to communicate the measurement of the torque-of-interest to one or more external system(s) 132, where the measurement can be displayed and/or processed further, e.g., as feedback data. The controller 122 may condition the measurement signal for compatible and convenient use with the external system(s) 132. For example, the controller 122 may convert the measurement into a digital signal for electronic communication to the external system(s) 132.

Figure 2:
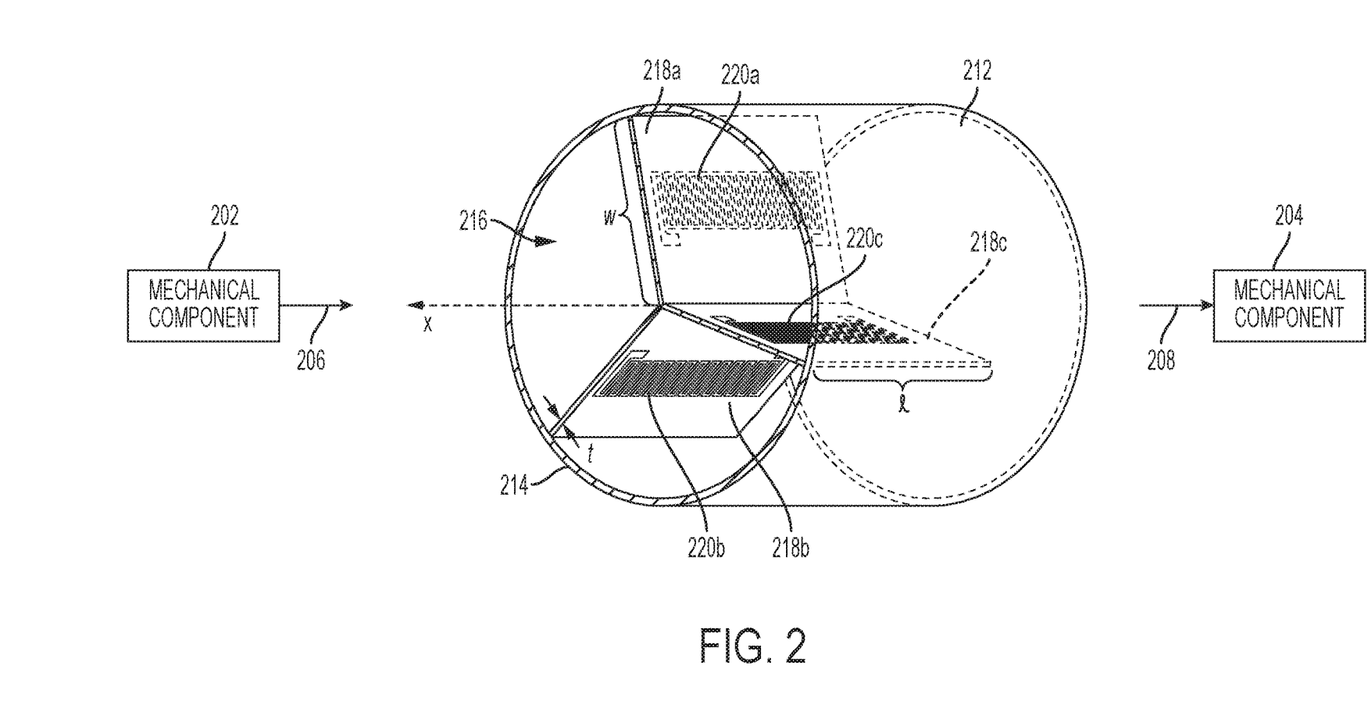
FIG. 2 illustrates an example torque-receiving body for a measurement assembly that measures torque generated by a mechanical component, according to aspects of the present disclosure.

FIG. 2 illustrates a section of an example torque-receiving body 212 that can be used, for example, in the measurement assembly 110. The torque-receiving body 212 includes an outer wall 214 that extends along an x-axis and defines a substantially cylindrical structure with an opening 216 with a substantially circular profile centered about the x-axis. The torque-receiving body 212 has a radius r (FIG. 4) defined from the x-axis to the outer surface of the outer wall 214. The outer wall 214 extends between a first coupling 206 and a second coupling 108. The outer wall 214 experiences the torque-of-interest from the first mechanical component 202 via the first coupling 206, and in turn, the outer wall 214 transmits the torque-of-interest to a second mechanical component 204 via the second coupling 208.

A plurality of radiating structures 218a-c are disposed in the opening 216 and extend radially from the x-axis to the outer wall 214. As shown in FIG. 2, the radiating structures 218a-c all meet at the x-axis, but other embodiments may include a central hub structure that connects the radiating structures 218a-c at the center of the opening 216. The radiating structures 218a-c may be integrally formed with the outer wall 214, or may be securely joined to the outer wall 214 via welding, chemical bonding, adhesives, fastening devices (e.g., bolts, screws, rivets, pins), press-fits, snap-fits, etc., or any combination thereof. In general, the outer wall 214 and the radiating structures 218a-c are configured so that the radiating structures 218a-c are able to experience consistent, measurable deformation in response to the torque-of-interest in the torque-receiving body 212.

In some embodiments, the radiating structures 218a-c are spaced from and do not directly engage the first coupling 206 or the second coupling 208. As such, the radiating structures 218a-c experience the effect of the torque-of-interest indirectly via the outer wall 214. In other embodiments, however, the radiating structures 218a-c extend along the x-axis into direct engagement with the first coupling 206 and the second coupling 208 (not shown), so that the torque-of-interest is also transmitted directly through the radiating structures 218a-c in combination with the outer wall 214, from the first mechanical component 202 to the second mechanical component 204.

Each of the radiating structures 218a-c has a width w that is substantially equal to the radius of the circular opening 216, a length/extending along the x-axis, and a relatively thin thickness t. The radiating structures 218a-c are separated from each other circumferentially around the axis x by a substantially equal angle. As configured, the radiating structures 218a-c appear as spokes, and the torque-receiving body 212 is multi-spoked. In the example embodiment of FIG. 2, the torque-receiving body 212 includes three radiating structures 218a-c, where adjacent radiating structures are separated by approximately 120° about the x-axis. In other embodiments, however, the torque-receiving body 212 may include any number of radiating structures greater than one, e.g., two, four, five, etc.

Figure 3:
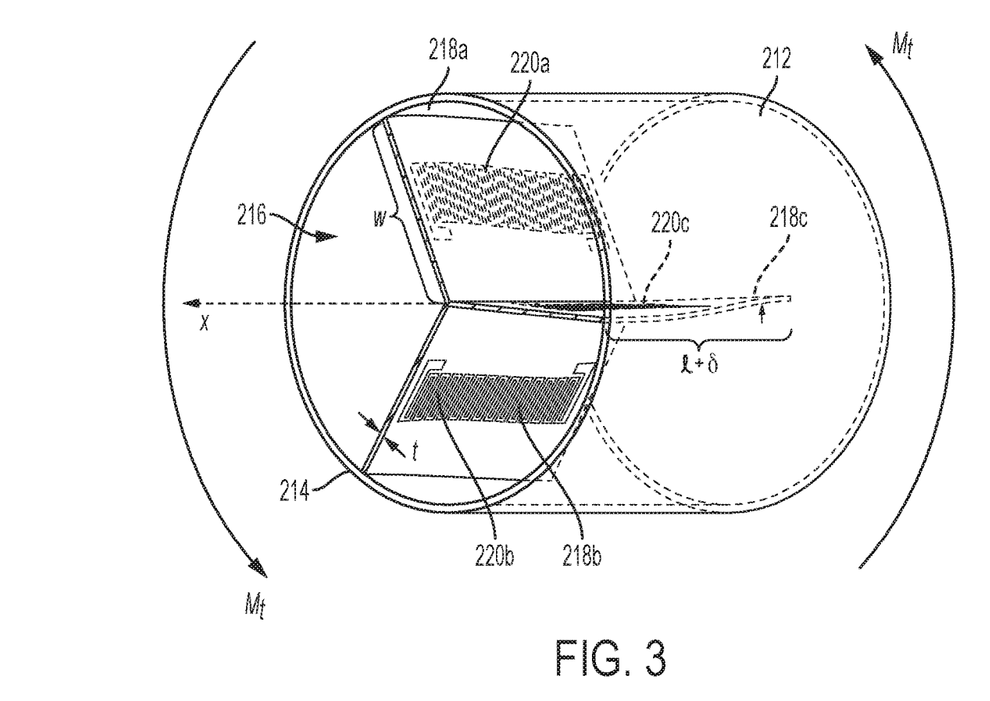
FIG. 3 illustrates the torque-receiving body of FIG. 2 experiencing a torsional deformation when the torque-receiving body experiences a torque, according to aspects of the present disclosure.

FIG. 2 illustrates the torque-receiving body 212 under zero load. Meanwhile, FIG. 3 illustrates a deformation in the torque-receiving body 212 when the torque-of-interest is generated in the torque-receiving body 212. Specifically, the torque-receiving body 212 experiences torsion and twists based on a moment $M_t$ about the x-axis caused by the torque-of-interest. As shown in FIG. 3, the radiating structures 218a-c experience torsional deformation when the torque-of-interest is generated in the torque-receiving body 212. Thus, the measurement assembly can determine the deformations of the radiating structures 218a-c to measure the torque-of-interest.

In particular, a plurality of strain sensors 220a-c are employed to determine the amount of deformation of the radiating structures 218a-c. Each of the strain sensors 220a-c are disposed on a respective radiating structure 218a, b, or c and is configured to provide a signal in response to deformation of the respective radiating structure 218a, b, or c. As each of the radiating structures 218a-c deforms in response to forces or torques, the respective strain sensor 220a, b, or c becomes elongated or compressed with the deformation. As shown in FIG. 2, the strain sensors 220a-c are oriented on the radiating structures 218a-c, so that the strain sensors 220a-c respond to deformations that occur along the x-axis, i.e., elongation or compression along the x-axis.

As shown in FIG. 2, each of the radiating structures 218a-c includes two opposing planar surfaces defined by the width w and the length 1. The strain sensors 220a-c may be mounted by an adhesive or other suitable technique to corresponding planar surfaces of the radiating structures 218a-c, respectively. For example, as illustrated in FIG. 2, the strain sensors 220a-c are all disposed on the counter clockwise side of the radiating structures 218a-c, respectively.

In some embodiments, the strain sensors 220a-c are resistive strain gauge sensors. The electrical resistance of a resistive strain gauge sensor changes with elongation or compression. Thus, the deformation in a given radiating structure can be measured by applying a current to the respective resistive strain gauge sensor and determining the electrical resistance. For example, a controller may control the current delivered to the sensors 220a-c to measure any change in electrical resistance in the sensors 220a-c.

Because elongation of the strain sensors 220a-c occurs in one direction and compression of the strain sensors 220a-c occurs in the opposite direction, the deformation can be expressed as a one-dimensional vector, where the magnitude of the vector represents the amount of elongation or compression and the direction of the vector is a positive or negative sign representing elongation or compression. In the examples described herein, elongation of the strain sensors 220a-c is represented by a positive value, while compression is represented by a negative value.

Referring to FIG. 3, when the torque-receiving body 212 experiences the torque-of-interest, all the radiating structures 218a-c elongate to a length of (1+δ) with the twisting of the torque-receiving body 212. As such, the signal from each of the strain sensors 220a-c (e.g., the measured electrical resistance of a resistive strain gauge sensor) provides a positive value.

When the torque-receiving body 212 is employed to measure the torque-of-interest, the torque-receiving body 212 may experience secondary deformations from secondary bending moments. The secondary deformations in the radiating structures 218a-c result in additional elongation or compression of the respective strain sensors 220a-c. As such, the signal from the strain sensors 220a-c might also reflect deformations from secondary bending moments as well as the torque-of-interest. The measurement assembly, however, is configured to eliminate the effects of such secondary bending moments from the measurement of the torque-of-interest. The strain sensors 220a-c are arranged on the plurality of radiating structures 218a-c so that the secondary deformations caused by the secondary bending moments as measured by the strain sensors 220a-c cancel each other out when the magnitudes and directions of the secondary deformations are combined together. In other words, secondary deformations experienced by one of the radiating structures 218a-c are offset in direction and magnitude by secondary deformations experienced by one or more of the other radiating structures 218a-c. Accordingly, when the one-dimensional vectors representing the deformations of the strain sensors 220a-c are combined, the parts of the deformations not resulting from the torque generated about the x-axis, i.e., the torque-of-interest, are cancelled out. Meanwhile, as described above, the parts of the deformations resulting from the torque-of-interest all provide a positive magnitude for the one-dimensional vectors and thus are not cancelled out. In general, the result of combining (i.e., adding) the one-dimensional vectors provides a measurement that only reflects the torque-of-interest.

Some systems may employ supporting structures to prevent or reduce secondary deformations. For instance, an example system may include stationary supporting structures to support a torque-receiving body and reduce secondary bending moments. To allow rotation of the torque-receiving body for the transmission of the torque-of-interest and to minimize secondary torques/forces, the supporting structures may include bearings or other elements that are likely to experience wear and may require repair or replacement. Because the arrangement of strain sensors 220a-c causes secondary deformations to offset each other, however, such supporting structures are unnecessary in the example embodiments. In particular, the example embodiments do not require the use of elements, such as bearings, that experience wear and require repair or replacement.

Figure 4:
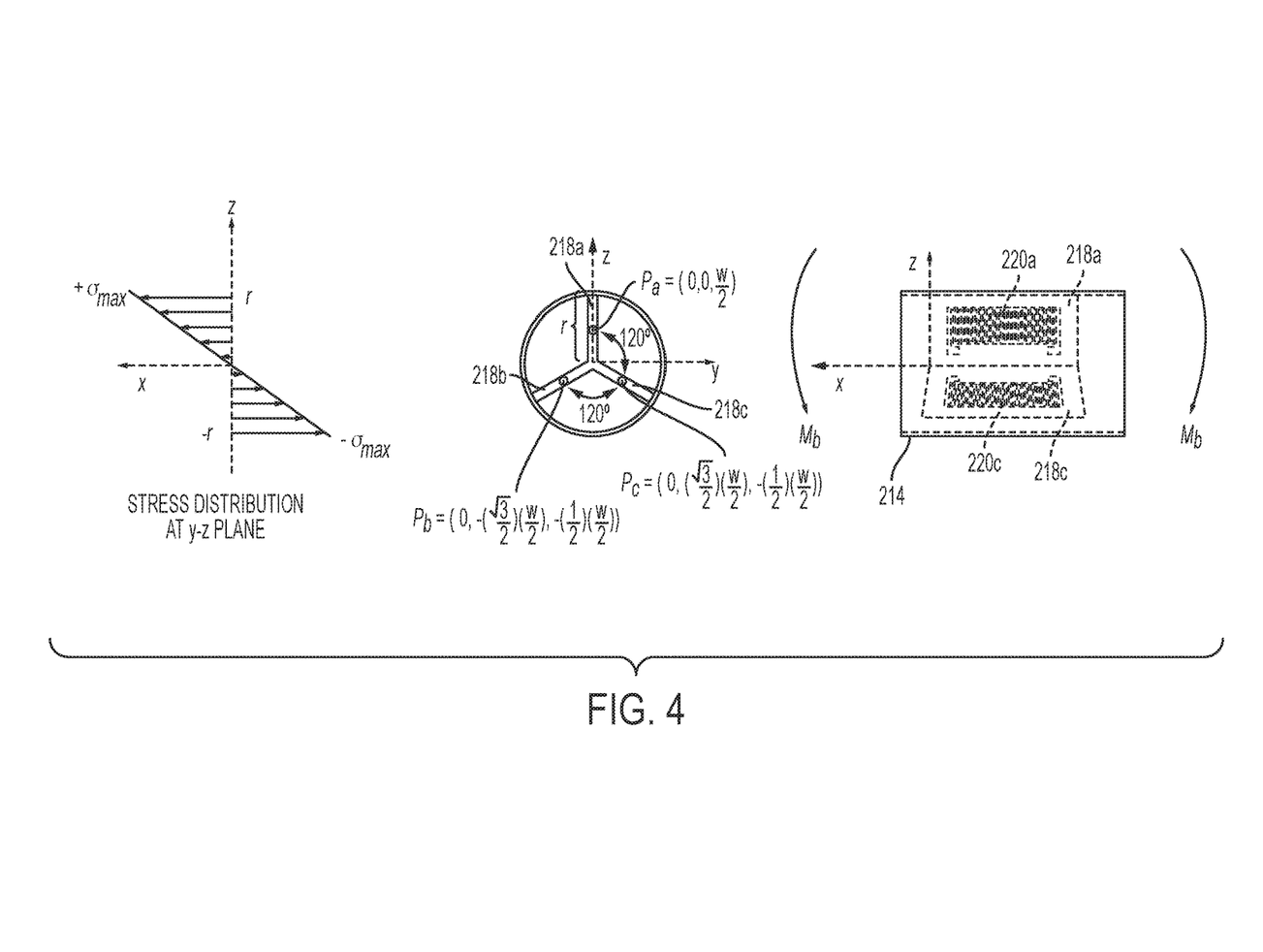
FIG. 4 illustrates the torque-receiving body of FIG. 2 experiencing a secondary bending moment, according to aspects of the present disclosure.

To illustrate how secondary deformations offset each other, the torque-receiving body 212 shown in FIG. 4 experiences a bending moment $M_b$ about the y-axis. FIG. 4 also shows the distribution of bending stresses $\pm\sigma_b$ that are experienced by the radiating structures 218a-c along the y-z plane at x=0. The x-axis is the neutral axis where $\sigma_b$=0. Above the x-axis, i.e., the top half of the torque-receiving body 212, the torque-receiving body 212 experiences tensile bending stresses $+\sigma_b$. Meanwhile, below the x-axis, i.e., the bottom half of the torque-receiving body 212, the torque-receiving body 212 experiences compressive bending stresses $-\sigma_b$. As such, when the radiating structure 218a, b, or c is above the x-axis, it experiences tensile bending stresses $+\sigma_b$ that cause its respective strain sensor 220a, b, or c to be elongated. On the other hand, when the radiating structure 218a, b, or c is below the x-axis, it experiences compressive bending stresses $-\sigma_b$ that cause its respective strain sensor 220a, b, or c to be compressed.

If the torque-of-interest (moment $M_t$) and the bending moment $M_b$ are both generated in the torque-receiving body 212, the respective strain sensor 220a, b, or c on a radiating structure 218a, b, or c above the x-axis becomes elongated by both the torque-of-interest and the bending moment $M_b$. Meanwhile, the respective strain sensor 220a, b, or c on a radiating structure 218a, b, or c below the x-axis is elongated by the torque-of-interest but compressed by the bending moment $M_b$.

Although the signal from an individual strain sensor 220a, b, or c may be affected by the bending moment $M_b$, the effect is cancelled out when the one-dimensional vectors associated with all the strain sensors 220a-c are combined together. Referring again to the distribution of bending stresses $\pm\sigma_b$ shown in FIG. 4, the tensile bending stress $+\sigma_b$ from the bending moment $M_b$ on the torque receiving body 212 increases proportionally with increasing z. The maximum tensile bending stress $-\sigma_b=+\sigma_{max}$ occurs at z=r, where r is the radius from the x-axis to the outer surface of the outer wall 214. The compressive bending stress $-\sigma_b$ below the x-axis from the bending moment $M_b$ on the torque receiving body 212 increases proportionally with decreasing z. The maximum compressive bending stress $-\sigma_b=-\sigma_{max}$ occurs at z=−r.

The elongation of one of the strain sensors 220a, b, or c caused by tensile bending stresses $+\sigma_b$ are cancelled out by the compression of the other strain sensors 220a, b, and/or c caused by the compressive bending stresses $-\sigma_b$. As shown in the example of FIG. 4, the radiating structure 218a is disposed above the x-axis, while the other two radiating structures 218b and c are disposed below the x-axis. To simplify the description, the radiating structure 218a is aligned with the z-axis, while the radiating structures 218b, c are positioned symmetrically on either side of the z-axis. Because the radiating structures 218 are separated by 120°, the radiating structures 218b and c are both 60° from the z-axis. At the edge of the radiating structure 218a at x=0, a point $p_a$ of the radiating structure 218a is at $$\left(x=0, y=0, z=\frac{r}{2}\right),$$

where r is the radius from the x-axis to the outer surface of the outer wall 214. At the edge of the radiating structure 218b at x=0, the position of the corresponding point $p_b$ of the radiating structure 118b can then be calculated to be $$\left(x=0, y=-\left(\frac{\sqrt{3}}{2}\right)\left(\frac{r}{2}\right), z=-\left(\frac{1}{2}\right)\left(\frac{r}{2}\right)\right).$$

At the edge of the radiating structure 218c at x=0, the position of the corresponding point $p_c$ of the radiating structure 218c can also be calculated to be $$\left(x=0, y=\left(\frac{\sqrt{3}}{2}\right)\left(\frac{r}{2}\right), z=-\left(\frac{1}{2}\right)\left(\frac{r}{2}\right)\right).$$

The points $p_a$, $p_b$, and $p_c$ are near the middle of their radiating structures 218a-c. If the maximum stress at distance $\pm r$ along the z-axis is $\pm\sigma_{max}$, respectively, it can be shown that the point $p_a$ experiences a tensile bending stress of $$\sigma_{ba} = \frac{\sigma\max}{2}, \text{ where } z=\left(\frac{r}{2}\right).$$

Meanwhile, it can be shown that the points $p_b$ and $p_c$ experience compressive bending stresses of $$\sigma_{bb} = \sigma_{bc} = -\frac{\sigma\max}{4},$$

where $$z=-\left(\frac{1}{2}\right)\left(\frac{r}{2}\right).$$

Accordingly, the strain sensor 220a is elongated according to $$\sigma_{ba} = \frac{\sigma\max}{2},$$

and the strain sensors 220b, c are compressed according to $$\sigma_{bb} = \sigma_{bc} = -\frac{\sigma\max}{4}.$$

Given the direct relationship between the elongation/compression and the bending stress $\pm\sigma_b$, the magnitude of compression caused by $\sigma_{bb}$ and $\sigma_{bc}$ half of the magnitude of elongation caused by $\sigma_{ba}$. When the one-dimensional vectors for the strain sensors 220a-c are combined, the compression caused by $\sigma_{bb}$ and $\sigma_{bc}$ combine to cancel out the elongation caused by $\sigma_{ba}$.

The other bending stresses $\pm\sigma_b$ acting on other points of the radiating structures 218a-c can be calculated in a similar manner to show that the compression or elongation caused by the bending stresses $\pm\sigma_b$ also cancel each other out when the one-dimensional vectors are combined. Furthermore, it can also be shown that the compression or elongation caused by the bending stresses $\pm\sigma_b$ cancel each other out regardless of where the radiating structures 218a-c are positioned relative to the y- and z-axes, as the torque-receiving body 212 rotates about the x-axis when the torque-of-interest is generated. In addition, any bending moments about the z-axis can also be similarly analyzed to show that the compression or elongation caused by the corresponding stresses cancel each other out when the one-dimensional vectors are combined. With the cancellation of compression or elongation caused by bending moments about the y- and z-axes, the combination of the one-dimensional vectors yields a result that only reflects the elongation caused by a moment about the x-axis, i.e., the torque-of-interest. As such, the result can be translated to the torque-of-interest.

III. Example Modular Measurement Assembly Unit

Figure 5:
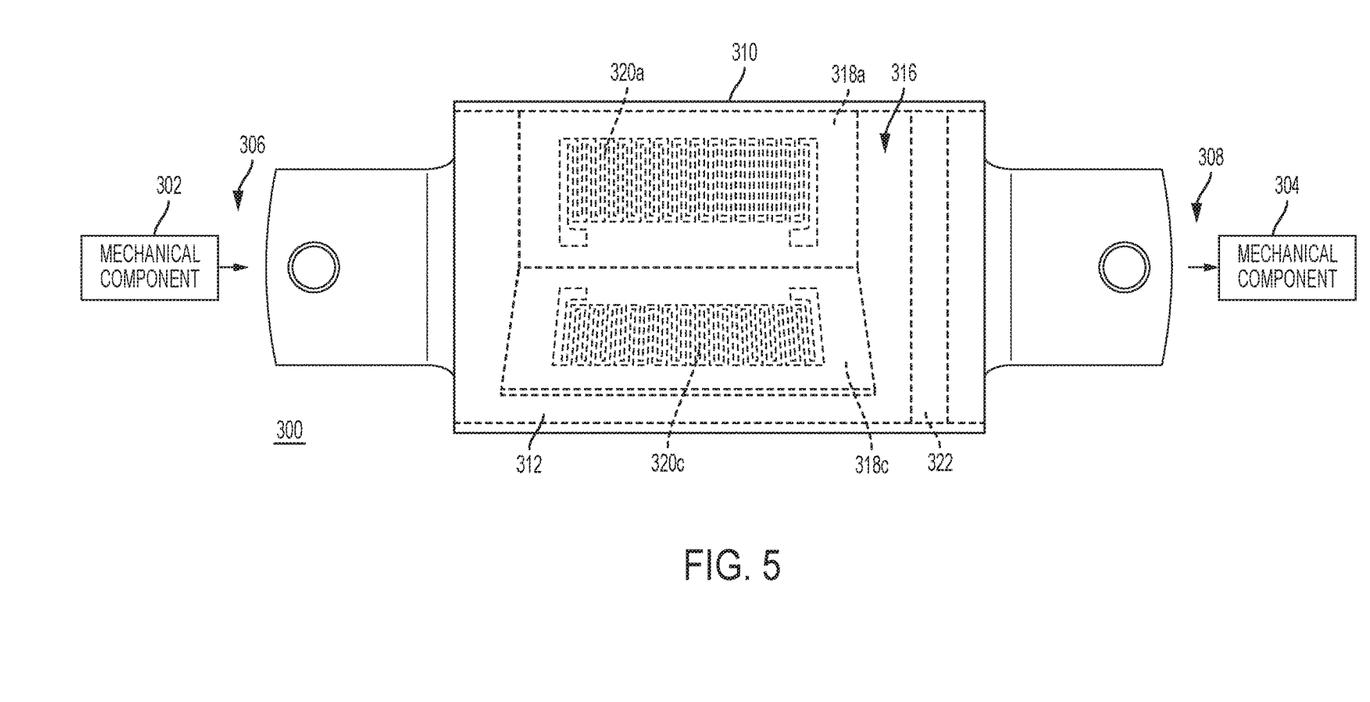
FIG. 5 illustrates an example system including a modular measurement assembly unit that measures torque generated by a mechanical component, according to aspects of the present disclosure.

FIG. 5 illustrates an example system 300 with a measurement assembly 310.

The measurement assembly 310 integrates a torque-receiving body 312, a plurality of strain sensors 320, and a controller 322 into a single modular unit. As a modular unit, the measurement assembly 310 provides a self-contained solid state torque sensor that can be easily and conveniently installed and implemented in the example system 300.

As FIG. 5 illustrates, the controller 322 is fixedly coupled to the torque-receiving body 312 and disposed inside an opening 316 of the torque-receiving body 312. The controller 322, the torque-receiving body 312, and the strain sensors 320 rotate as a single body when the torque-receiving body 312 experiences a torque-of-interest. In addition, the position of the controller 322 inside the opening 316 and proximate to the strain sensors 320 allows the controller 322 to be more easily coupled, e.g., via wires, to the strain sensors 320 (not shown). In alternative embodiments, however, the controller 322 may be coupled to the torque-receiving body 312 at a different location. In addition, the shape, size, and weight of the controller 322 are configured to allow the torque-receiving body 312 to rotate without creating any undesired imbalances or affecting the measurement of the torque-of-interest with the torque-receiving body 312.

Figure 6:
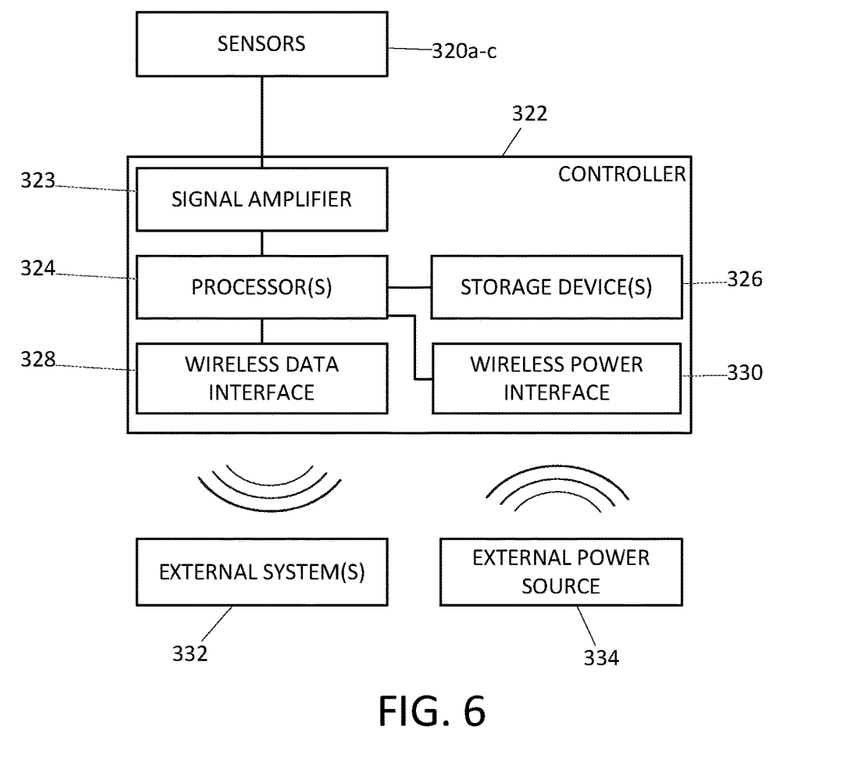
FIG. 6 illustrates an example controller including wireless interfaces for data and power transmission for the modular measurement assembly unit of FIG. 5, according to aspects of the present disclosure.

Referring to FIG. 6, the controller 322 receives the signals from the strain sensors 320, where the signals indicate deformations in radiating structures 318 of the torque-receiving body 312 in response to the torque-of-interest. The controller 322 includes a signal amplifier 323 that amplifies the signals from the strain sensors 320 to overcome any unwanted signal noise. The controller 322 also includes one or more processors 324 for processing the signals from the strain sensors 320 and determining the torque-of-interest.

The use of the strain sensors 320 may require initial calibration when mounted on the radiating structures 318. The signals from the strain sensors 320 may indicate some baseline deformation of the radiating structures 318 at zero load when the torque-receiving body 312 does not experience any actively generated torques or forces. Calibration data accounts for the baseline deformation detected by the strain sensors 320 and allows the controller 322 to determine more accurately the deformation that actually occurs in response to an applied load. The controller 322 includes one or more data storage devices 326 to store the calibration data.

When the controller 322 is combined with the torque-receiving body 312 during initial manufacturing of the measurement system 310, the calibration data for the corresponding set of strain sensors 320 can be written to the one or more data storage devices 326 for later use by the one or more processors 324. Other data may also be written to the one or more data storage devices 326 for operation of the measurement assembly 310. The measurement assembly 310 is thus factory-calibrated. As long as the controller 322 remains with the set of strain sensors 320 and the calibration data remains available on the one or more data storage devices 326 (e.g., non-volatile memory), use of the measurement assembly 310 should not require further calibration. Accordingly, the factory-calibrated measurement assembly 310 can be conveniently installed in the example system 300 without requiring any recalibration or programming at the time of installation.

The controller 322 is configured to communicate the measurement of the torque-of-interest to one or more external systems 332, where the measurement can be displayed and/or processed further, e.g., as feedback data. The controller 322 may condition the measurement signal for compatible and convenient use with the external system(s). For instance, the controller 322 may convert the measurement into a digital signal for electronic communication to the external system(s) 332.

In addition, the measurement assembly 310 requires electrical power to operate the controller 322 and the strain sensors 320. The controller 322 and the strain sensors 320 reside on the same electrical circuit, and the controller 322 controls the current delivered to the strain sensors 320. For instance, if the strain sensors 320 are resistive strain gauges, the controller 322 controls the current delivered to the strain sensors 320 to measure any change in electrical resistance in the strain sensors 320. The controller 322 then requires power to process the electrical resistance measurements and determine a measurement of the torque-of-interest.

A measurement assembly can employ a slip ring or similar device to allow data and power transmission between the measurement assembly and other systems. In general, slip rings allow a stationary device to maintain conductive contact with a rotating body. Thus, a slip ring can allow electrical power to be delivered from a stationary external power source to the rotating torque-receiving body. Additionally, a slip ring can allow torque measurements and other data to be communicated between the rotating controller and stationary external system(s).

Rather than employing a slip ring, however, the measurement assembly 310 employs wireless transmission of data and power to achieve greater modularity and compactness. The controller 322 includes a wireless data interface 328 and a wireless power interface 330. The wireless data interface 328 allows the controller 322 to send or receive data to/from the external system(s) 332. The wireless data interface 328, for example, may employ a wireless local area network (WLAN) (e.g., Wi-Fi™) or a radio frequency (RF) technology, such as short-wavelength UHF radio waves (e.g., BLUETOOTH®) or electromagnetic induction (e.g., near field communication (NFC)).

The wireless power interface 330 provides power to the controller 322 and the strain sensors 320. The wireless power interface 330, for example, may employ electromagnetic induction to receive electrical power from an external power source 334. The measurement assembly 310 generally has low power requirements, making the use of electromagnetic induction practical. Although not shown in FIG. 6, it is contemplated that power received from the external power source 334 can be stored in a power storage device, such as a rechargeable battery. Alternatively, the measurement assembly 310 operates on battery power alone and does not require any power from an external power source.

The convenience of employing the measurement assembly 310 is enhanced by wireless transmission of data and power. Installation of the modular unit 310 does not require establishing a direct conductive contact with the torque-receiving body 312 with a slip ring, wired connections, etc., for data and power transmission.

As shown in FIG. 5, the torque-receiving body 312 is coupled to a first mechanical component 302 and experiences the torque-of-interest. In response to the torque-of-interest, the torque-receiving body 312 rotates to transmit the torque-of-interest to the second mechanical component 304. By way of example, the torque-receiving body 312 engages the first mechanical component 302 and the second mechanical component 304 by respective ball lock bolts 306, 308. The ball lock bolts 306, 308 allow the measurement assembly 310 to be easily installed and removed from the example system 300 for maintenance, replacement, etc., thereby enhancing the modularity of the measurement assembly 310. It is understood that other techniques or combination of techniques for removably coupling the measurement assembly 310 to the first mechanical component 302 and the second mechanical component 304 may be employed. Such techniques include, but are not limited to, removable fastening devices (e.g., bolts, screws, pins), threaded connections, press-fits, snap-fits, etc.

Figure 7:
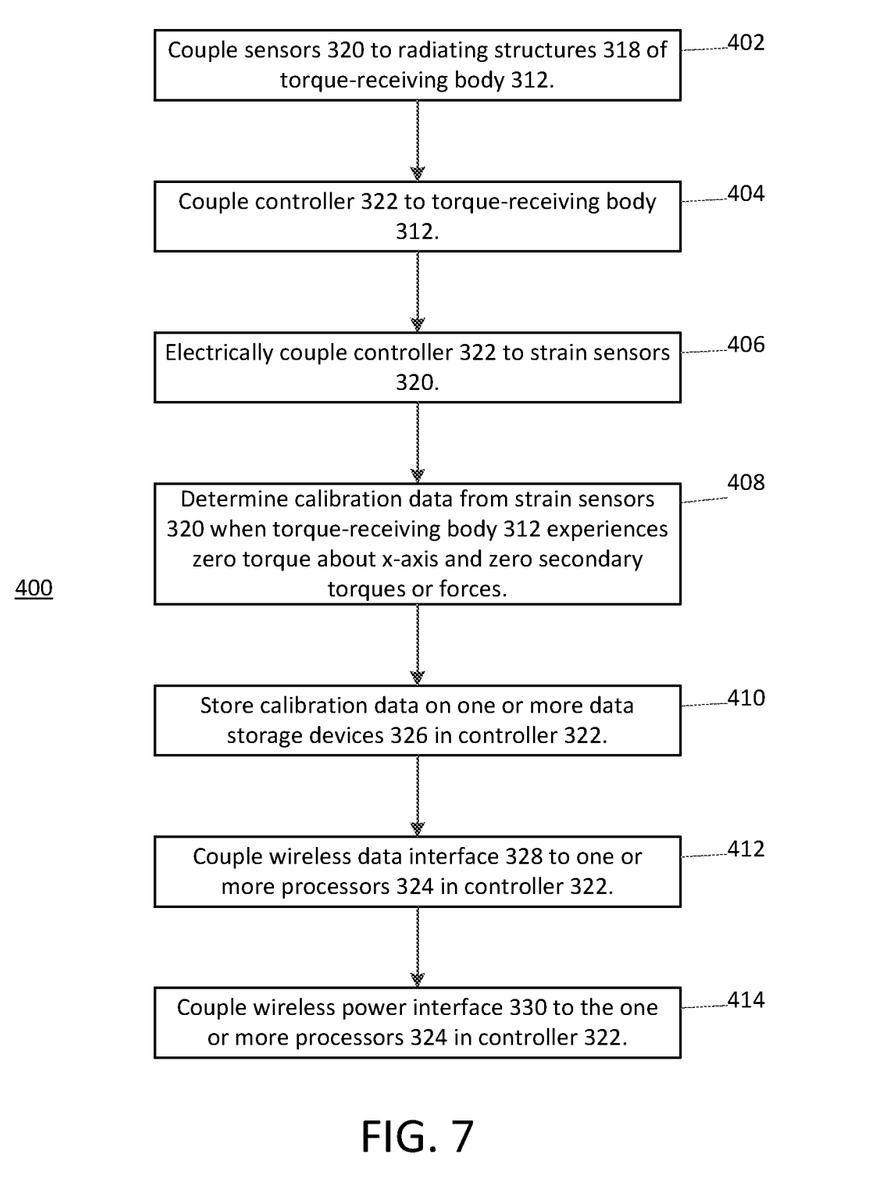
FIG. 7 illustrates an example approach for making a modular measurement assembly unit, according to aspects of the present disclosure.

In view of the foregoing, FIG. 7 summarizes an example approach 400 for making a modular measurement assembly unit. As shown in FIG. 7, act 402 includes coupling the strain sensors 320 to the radiating structures 318 of the torque-receiving body 312. Act 404 includes fixedly coupling the controller 322 to the torque-receiving body 312. Act 406 includes electrically coupling the controller 322 to the strain sensors 320. Act 408 includes determining calibration data from the strain sensors 320 when the torque-receiving body 312 experiences zero torque about the x-axis and zero secondary torque or force. Act 410 includes storing the calibration data on the one or more data storage devices 326. Act 412 includes coupling the wireless data interface 328 to the one or more processors 324. Additionally, act 414 includes coupling the wireless power interface 330 to the processor 324.

Accordingly, the measurement assembly 310 can be easily and conveniently installed and implemented in the example system 300. As described above, combining the controller 322 with the torque receiving body 312 allows the measurement assembly 310 to be pre-configured with calibration data and installed as a single "plug and play" modular unit. In addition, the wireless data interface 328 and the wireless power interface 330 eliminate the need to establish direct conductive contact between the torque-receiving body 312 and additional components for data and power transmission. Furthermore, using techniques, such as ball lock bolts, that removably couple the measurement assembly 310 to the example system 300 facilitates installation and removal for repair or replacement.

In the embodiments described above, the strain sensors may be oriented on the radiating structures, so that the strain sensors respond to deformations that occur along an x-axis, i.e., elongation or compression along the x-axis. It is understood, however, that the strain sensors can be arranged according to different orientations. It is contemplated that the strain sensors can be arranged to respond to deformations along any direction or combination of directions. It is also contemplated that more than one strain sensor can be employed on each radiating structure to respond to deformations that occur along more than one direction. In general, the strain sensors are arranged so that the secondary deformations caused by the secondary forces/torques as measured by the strain sensors cancel each other out when the magnitudes and directions of the secondary deformations are combined together.

Although the embodiments described above may employ strain sensors, e.g., resistive strain gauge sensors, it is understood that other types of sensors may be alternatively or additionally employed to determine the amount of torsion in the measurement assembly. Such sensors include, but are not limited to, piezoelectric sensors, accelerometers, optical sensors, etc. Such sensors may determine the torsional effect on the measurement assembly by the measurement of force, acceleration, position, displacement, angle, etc.

The torque-receiving bodies in example embodiments may be formed from a suitable material, such as a metal (e.g., steel, aluminum, etc.), that can transmit the required amount of torque and allow the torque to be measured consistently. The deformation of the torque-receiving bodies depends on the material. The measurement assemblies are configured to account for this dependence. For example, the geometries of the measurement assemblies are configured to enable effective measurement of the deformation. In general, the measurement assemblies are configured to accommodate expected operating conditions, such as high rotational velocities of the mechanical components in the system.

In addition, although the torque-receiving bodies in the embodiments above may employ a substantially cylindrical outer wall with an inner opening with a substantially circular profile, it is understood that other shape profiles (e.g., square, rectangle, ellipse, polygon, etc.) may be employed for any aspect of the torque-receiving body.

The embodiments described herein may employ controllers and other devices for processing information and controlling aspects of the example systems. For example, the example system 100 shown in FIG. 1 includes the controller 122 and the example system 300 shown in FIG. 5 includes the controller 322. Generally, the controllers include one or more processors. For example, the controller 322 includes one or more shared or dedicated processors 324.

The processor(s) of a controller or other devices may be implemented as a combination of hardware and software elements. The hardware elements may include combinations of operatively coupled hardware components, including microprocessors, memory, signal filters, circuitry, etc. The processors may be configured to perform operations specified by the software elements, e.g., computer-executable code/instructions stored on computer readable medium. The processors may be implemented in any device, system, or subsystem to provide functionality and operation according to the present disclosure. The processors may be implemented in any number of physical devices/machines. Indeed, parts of the processing of the example embodiments can be distributed over any combination of processors for better performance, reliability, cost, etc.

The physical devices/machines can be implemented by the preparation of integrated circuits or by interconnecting an appropriate network of conventional component circuits, as is appreciated by those skilled in the electrical art(s). The physical devices/machines, for example, may include field programmable gate arrays (FPGA's), application-specific integrated circuits (ASIC's), digital signal processors (DSP's), etc.

Appropriate software can be readily prepared by programmers of ordinary skill based on the teachings of the example embodiments, as is appreciated by those skilled in the software arts. Thus, the example embodiments are not limited to any specific combination of hardware circuitry and/or software. Stored on one computer readable medium or a combination of computer readable media, the computing systems may include software for controlling the devices and subsystems of the example embodiments, for driving the devices and subsystems of the example embodiments, for enabling the devices and subsystems of the example embodiments to interact with a human user (user interfaces, displays, controls), etc. Such software can include, but is not limited to, device drivers, operating systems, development tools, applications software, etc. A computer readable medium further can include the computer program product(s) for performing all or a portion of the processing performed by the example embodiments. Computer program products employed by the example embodiments can include any suitable interpretable or executable code/instructions, including but not limited to complete executable programs, interpretable programs, scripts, dynamic link libraries (DLLs), applets, etc. The processors may include, or be otherwise combined with, computer-readable media. Some forms of computer-readable media may include, for example, a hard disk, any other suitable magnetic medium, any suitable optical medium, RAM, PROM, EPROM, flash memory, any other suitable memory chip or cartridge, any other suitable non-volatile memory, a carrier wave, or any other suitable medium from which a computer can read. For example, the one or more data storage devices 326 shown in FIG. 6 may include any of these forms of computer-readable media.

The controllers and other devices may also include databases for storing data. For example, the controller 322 includes one or more data storage devices 326 that store calibration data for processing the signals from the strain sensors 322. Such databases may be stored on the computer readable media described above and may organize the data according to any appropriate approach. For examples, the data may be stored in relational databases, navigational databases, flat files, lookup tables, etc.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A sensor system for determining torque, comprising:
   a body, including:
      an outer wall defining an inner opening centered about an axis; and
      a plurality of radiating structures disposed in the opening and extending radially from the axis to the outer wall, the radiating structures spaced circumferentially around the axis by a substantially equal angle;
   a sensor disposed on each of the radiating structures, the sensor configured to generate a signal providing a vector indicating deformations of the corresponding radiating structure caused by both: (i) a torque experienced by the body about the axis, and (ii) a secondary torque or force experienced by the body; and
   a controller electrically coupled to the plurality of sensors, the controller including one or more processors and one or more computer-readable storage hardware devices, the one or more computer-readable storage hardware devices storing computer-executable instructions that cause the one or more processors to determine, by combining the vectors provided by the signals from the sensors, a measurement of the torque about the axis, the sensors being arranged on the radiating structures such that combining the vectors substantially eliminates any effect of the secondary torque or force from the measurement of the torque about the axis.

2. The system of claim 1, wherein the sensor is a strain sensor, and the vector provided by the signal from the strain sensor is a one-dimensional vector indicating compression or elongation of the corresponding radiating structure caused by both: (i) the torque experienced by the body about the axis, and (ii) the secondary torque or force experienced by the body.

3. The system of claim 2, wherein the plurality of sensors includes resistive strain gauge sensors.

4. The system of claim 2, wherein the strain sensors are configured to determine the compression or elongation of the radiating structures along the axis.

5. The system of claim 1, wherein the plurality of radiating structures includes three radiating structures spaced circumferentially around the axis by approximately 120 degrees.

6. The system of claim 1, wherein the controller is fixedly coupled to the body.

7. The system of claim 1, wherein the controller includes one or more computer-readable storage hardware devices storing calibration data for the plurality of sensors.

8. The system of claim 1, wherein the controller includes a wireless data interface, the controller communicating, to one or more external systems, the measurement of the torque about the axis via the wireless data interface.

9. The system of claim 1, wherein the controller includes a wireless power interface, the controller wirelessly receiving power from an external power source via the wireless power interface.

10. The system of claim 1, wherein the secondary torque or force experienced by the body includes bending forces on the body.

11. A sensor system for determining torque, comprising:
   a body, including:
      an outer wall defining an inner opening centered about an axis; and
      a plurality of radiating structures disposed in the opening and extending radially from the axis to the outer wall, the radiating structures being spaced circumferentially around the axis by a substantially equal angle; and
   a sensor disposed on each of the radiating structures, the sensor configured to generate a signal providing a vector indicating deformations of the corresponding radiating structure caused by both: (i) a torque experienced by the body about the axis, and (ii) a secondary torque or force experienced by the body, the sensors being arranged on the radiating structures such that combining the vectors provided by the signals from the sensors substantially eliminates any effect of the secondary torque or force from the measurement of the torque about the axis and provides a measurement of the torque about the axis.

12. The system of claim 11, wherein the sensor is a strain sensor, and the vector provided by the signal from the strain sensor is a one-dimensional vector indicating compression or elongation of the corresponding radiating structure caused by both: (i) the torque experienced by the body about the axis, and (ii) the secondary torque or force experienced by the body.

13. The system of claim 12, wherein the plurality of sensors includes resistive strain gauge sensors.

14. The system of claim 12, wherein the strain sensors are configured to determine the compression or elongation of the radiating structures along the axis.

15. The system of claim 11, wherein the plurality of radiating structures includes three radiating structures spaced circumferentially around the axis by approximately 120 degrees.

16. A sensor system for determining torque, comprising:
a controller including one or more processors and one or more computer-readable storage hardware devices, the controller configured to be electrically coupled to a plurality of sensors arranged on a sensor body including:
   an outer wall defining an inner opening centered about an axis; and
   a plurality of radiating structures disposed in the opening and extending radially from the axis to the outer wall, the radiating structures being spaced circumferentially around the axis by a substantially equal angle, a sensor disposed on each of the radiating structures,
the controller configured to receive a signal generated by each sensor, the signal providing a vector indicating deformations of the corresponding radiating structure caused by: (i) a torque experienced by the body about the axis, and (ii) a secondary torque or force experienced by the body, and
the one or more computer-readable storage hardware devices storing computer-executable instructions that cause the one or more processors to determine a measurement of the torque about the axis by combining the vectors provided by the signals from the sensors, the combination of the vectors substantially eliminating any effect of the secondary torque or force from the measurement of the torque about the axis.

17. The system of claim 16, wherein the controller is fixedly coupled to the sensor body.

18. The system of claim 16, wherein the one or more computer-readable storage hardware devices store calibration data for the plurality of sensors.

19. The system of claim 16, wherein the controller includes a wireless data interface, the controller communicating, to one or more external systems, the measurement of the torque about the axis via the wireless data interface.

20. The system of claim 16, wherein the controller includes a wireless power interface, the controller wirelessly receiving power from an external power source via the wireless power interface.

* * * * *